Mar. 13, 1923.
R. G. WILLARD
ICE MAKING APPARATUS
Original Filed May 28, 1921    2 sheets-sheet 1

1,448,584

Inventor
R. G. Willard,
By Shepherd Campbell
Attorneys

Mar. 13, 1923.
R. G. WILLARD
ICE MAKING APPARATUS
1,448,584
Original Filed May 28, 1921  2 sheets-sheet 2
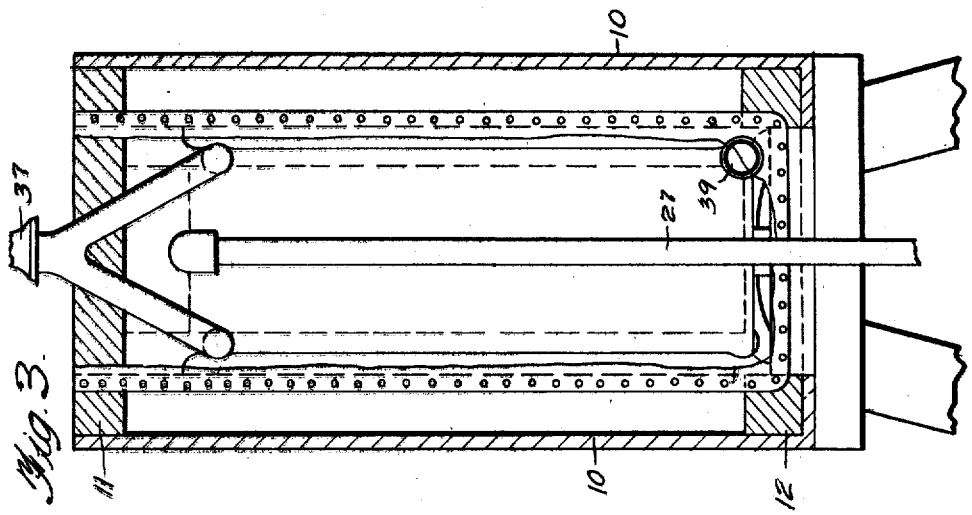
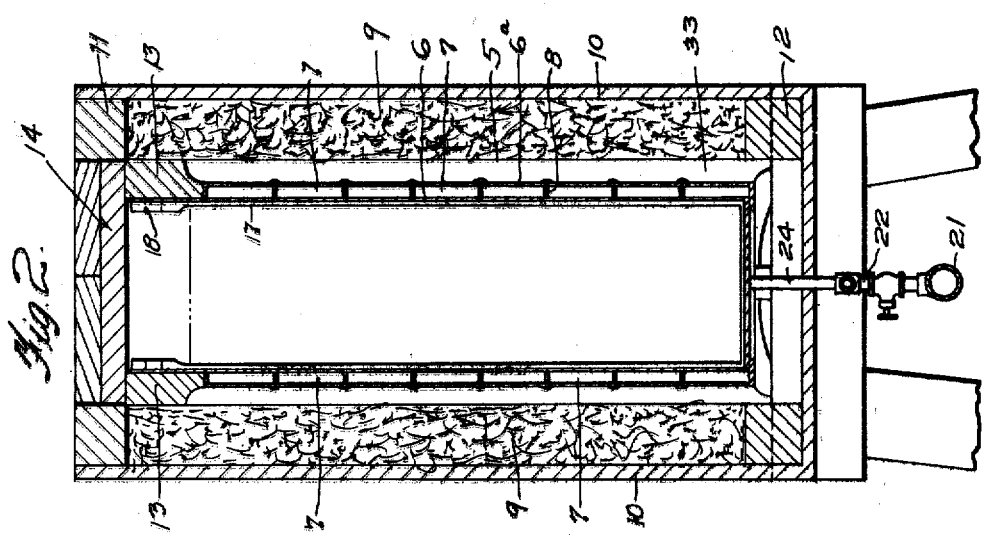
R. G. Willard, Inventor
By Shepherd & Campbell
Attorneys Patented Mar. 13, 1923.

1,448,584

UNITED STATES PATENT OFFICE.

ROSCOE GREEN WILLARD, OF SAN BERNARDINO, CALIFORNIA.

ICE-MAKING APPARATUS.

Application filed May 28, 1921, Serial No. 473,277. Renewed December 19, 1922.

*To all whom it may concern:*

Be it known that I, ROSCOE GREEN WILLARD, a citizen of the United States, residing at San Bernardino, in the county of San Bernardino and State of California, have invented certain new and useful Improvements in Ice-Making Apparatus, of which the following is a specification, reference being had therein to the accompanying drawings.

This invention relates to a method of and apparatus for making pure ice from raw water. Broadly stated, the invention resides in circulating water through the cans or compartments in which the water is frozen in contradistinction to merely agitating the water in said compartments as has heretofore been the practice.

Further objects of the invention and many advantages flowing therefrom will be hereinafter set forth.

The present methods of artificially freezing ice for commercial purposes usually involve circulating ammonia or some other volatile agent such as ether, bi-sulphide of carbon, carbonic acid, air, etc., in pipes, which pipes of circulating ammonia are either within or about a receptacle in which water is placed and the expansion of the ammonia gas as it circulates through the pipes creates the low temperature which causes the water to become frozen. In the most common type of artificial means for making ice for commercial purposes the ammonia pipes are immersed in a salty solution or brine and the cans are placed in the brine. The circulation of the ammonia through the pipes reduces the temperature of the brine and the cans immersed therein in turn transmit the cold to the water in said cans and cause the freezing to take place. In the present known methods of artificial freezing of ice, mechanical means for agitating the water in the freezing cans is used for the purpose of making the water freeze clear and pure. Agitation of the water serves to drive the impurities in the water to the center of the cake of the ice causing a white appearing condition which is called the core of the ice cake. The mechanical methods which are now used for the purpose of securing this agitation in the water of the freezing cans include the following:

Either the tilting or rocking back and forth of the freezing can itself; agitation by introducing air pressure into the water of the freezing can so as to cause the water to move in a limited way and also agitation by means of paddles moving back and forth in the water. Other mechanical devices have been and can be used for the agitation of water in the freezing can.

It is to be noted, however, that all of these means of agitation are confined to the agitation of the water which is in the freezing can itself; that is, no water from outside the freezing can is introduced into the freezing can at any time during the agitation of said water, under the methods now in use.

The two methods now in general use in making artificial ice for commercial purposes are the so called can method which has been hinted at above and the so called plate method. In the can method a can or series of cans is immersed in brine through which pipes of circulating ammonia are driven by a pump and the expansion of the ammonia gas in the pipes causes the fall in the temperature of the brine and hence of the water. The water in the can is generally agitated as mentioned above by some mechanical means in order to get as pure a cake of ice as possible. The cans thus immersed in the brine are movable and to recover the cake of ice from the can the can and the cake of ice are first removed from the brine, the two are then placed on a so called can dump where a spray of warm water is played upon the outside of the can and when the temperature of the can has been sufficiently increased, the ice will slip out of the can, when the can is properly tilted for that purpose. The cans are then moved back into the brine and refilled with water and the process of freezing again started.

In the plate method, the water to be frozen is put into a large tank or can. The water after being introduced into the can is usually agitated by air under about five pounds pressure and is kept in continuous agitation during the freezing process. The plate is composed of two sheet steel plates which are bolted against the ammonia circulating pipes, one sheet on each side. The plates and ammonia pipes are immersed in the water, and the water in splashing back and forth freezes to the plates, thereby making clear ice. The freezing process is stopped before all the water in the can or tank is frozen solid and the unfrozen water containing the impurities in the water is flushed out in the sewer. To obtain this ice from the plates the usual method is to reverse the ammonia through the coils thereby introducing more or less heat which thaws the ice free from the plates and the ice cake itself is then lifted from the tank by suitable apparatus and carried over to a tilting table and there sawed in blocks of appropriate size.

According to the present invention the ice is frozen in cans by circulating ammonia around the same, but here the similarity between my method and the old can method ceases. No brine solution is used and instead of a mechanical or air pressure method of agitation of water inside the can a different method is used to secure the desired result of having a frozen cake of pure ice without the flaw of a so called white core in the ice. This is accomplished by circulating water into and out of the freezing cans. This method is used as being an improvement upon the mechanical method of agitating the water heretofore used. In the drawings, which are illustrative of one embodiment of the invention each of the cans about which the ammonia circulates is connected up by means of pipes to an elevated tank and in the beginning of the process of freezing, water flows by gravity or pressure from this elevated tank through these pipes into the bottom of the freezing cans, and the water thus flowing in is drained out of the cans into a pipe and permitted to flow by gravity into another tank below the plane of the bottom of the freezing cans and from this latter tank is forced by means of a small force pump up again into the elevated tank. Thus a continuous circulation of water is kept up, first from the elevated tank into the freezing cans, from the freezing cans through the lower tank and thence back up into the elevated tank. The circulation of water through the freezing can has the tendency to cause an eddy of sufficient force to drive the impurities in the water off through a discharge pipe and down into the lower tank where the impurities are caught in a trap for that purpose. There is also a trap provided for the impurities in the elevated tank. The impure water is the last to freeze in any process and it is the object of all makers of ice freezing machines to secure a method of doing away with the impurities in the water so that the same does not become frozen in with the ice and cause the white core.

In the accompanying drawings:

Fig. 2 is a transverse vertical section upon line 2—2 of Fig. 1; and

Fig. 3 is an end elevation, with parts broken away, of the can receiving tank or compartment.

Like numerals designate corresponding parts in all of the figures of the drawings.

Figure 1:
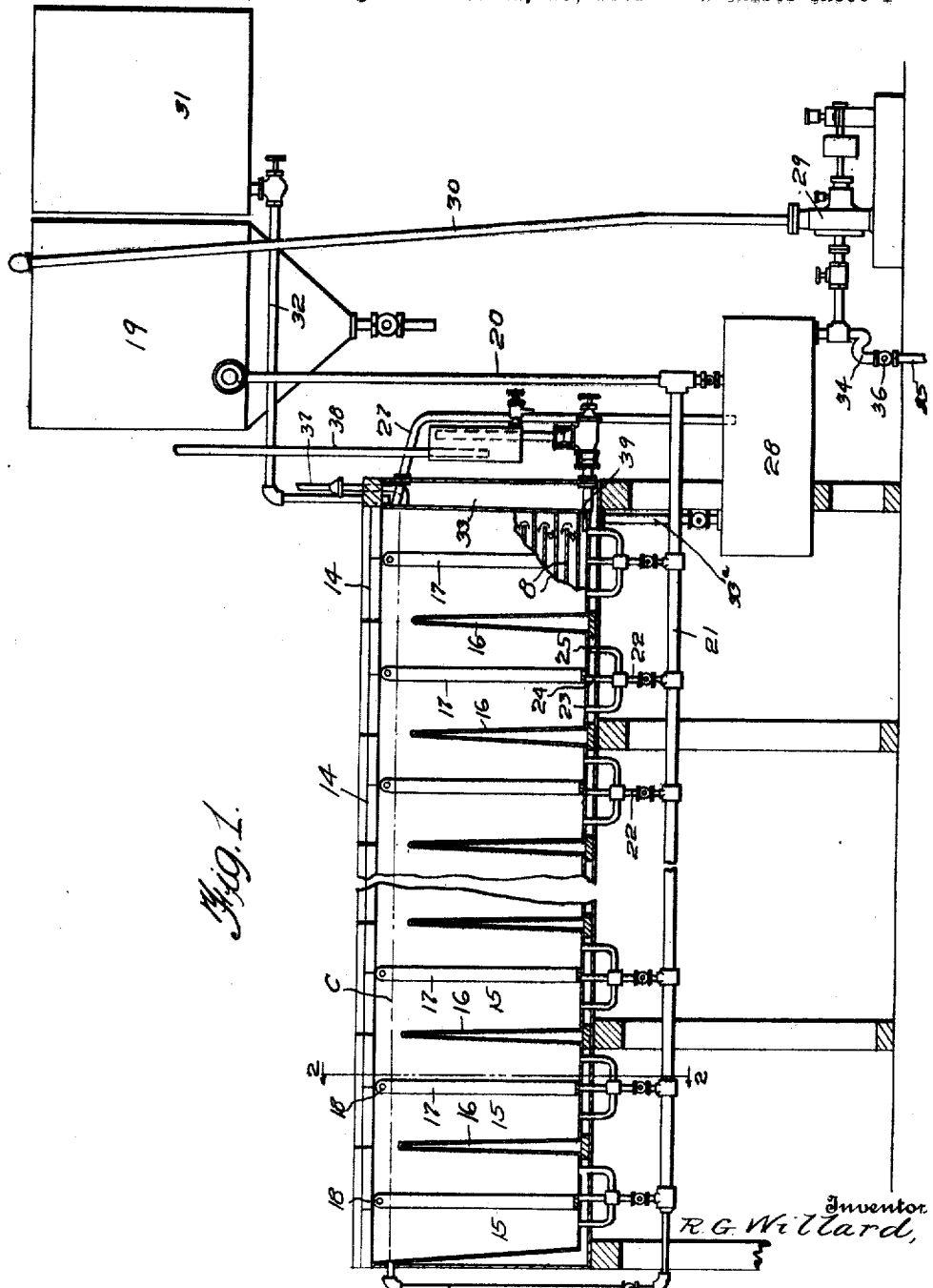
Fig. 1 is a longitudinal vertical section of an apparatus constructed in accordance with the invention with certain of the parts shown in elevation.

The apparatus shown comprises a main freezing can or compartment consisting of an outer, preferably sheet metal wall 5 and an inner wall 6, this inner wall preferably having a plurality of ammonia circulating pipes 7 integrally formed therewith and, in the present instance, shown as being rectangular in cross section so that the cooling medium which passes through them comes into contact with substantially all parts of the surface of the freezing cans with which the water to be frozen contacts.

In the present embodiment of the invention, the ammonia circulating pipes are formed by interposing division strips 8 between the inner walls 6 and plates 6ª, and by terminating each alternate strip 8 a little short of the opposite end of the main freezing can, so that the circulation of the ammonia or other volatile agent will be in the direction of the arows a, see Fig. 1. Insulating material 9 is disposed outwardly of the outer wall 5, of the main freezing can and is held in place by ceiling or sides 10, these sides being secured to upper and lower main frame members 11 and 12. Longitudinally extending strips 13 impart the necessary rigidity to the upper edge of the can to enable it to support covers 14 which are made of such heavy and thick material as to enable them to properly insulate the interior of the main freezing can from the outside air.

The main freezing can is divided into a plurality of freezing compartments 15 by division strips 16. The strips taper toward their top so that the resultant cakes of ice will taper toward the bottom, thus rendering it possible to easily withdraw these cakes of ice, as hereinafter set forth. Stirrups 17 of U formation are disposed in the several freezing compartments and these stirrups are provided with openings 18 adjacent their upper ends in which any suitable lifting agent may be engaged to lift the cakes of ice from the several compartments after the water has been frozen as hereinafter set forth. The water to be frozen is, in the present embodiment of the invention, supplied from a supply tank of raw water, indicated at 19, passing thence through a pipe 20 and a horizontal header pipe 21, into the bottoms of the several freezing compartments through branch pipes 22, 23, 24 and 25. In addition, a valved supply pipe 26 leads into the main freezing can at a level above the top of the separating partitions 16, and at substantially the level of the mouth of an overflow pipe 27 located at the opposite end of the main freezing can. This overflow pipe discharges into an overflow tank 28 and the water from this overflow tank is driven by a circulating pump 29 upwardly through a pipe 30 and discharged into the tank 19. A thawing water tank 31 supplies water through a pipe 32 to the space 33 between the walls 5 and 6 of the main freezing can, when it is desired to loosen the cakes of ice and permit them to be withdrawn by means of the stirrups 17. A drain line 33ª conducts the thawing water into the overflow tank 28 after it has served its purpose. A trap 34 is disposed between the tank 28 and a sewer discharge pipe 35 there being a valve 36 disposed in the pipe 35. The ammonia suction line is indicated at 37 and the ammonia expansion line is indicated at 38. This expansion line enters at 39 and the circulation of the ammonia is in the direction indicated by the arrows a.

The operation of the particular apparatus shown is as follows: The freezing water flows from tank 19 to the several compartments 15 through the connections described rising to the level indicated by the dotted line c in Fig. 1, and overflowing through pipe 27 to the tank 28 and being returned to the tank 19 by the pump 29 as described. The circulation set up through the several compartments and through pipes 27 causes the impurities in the water to be collected in the trap 34. In the course of time and as the cakes of ice freeze the entry of the water through the pipes 22, 23, 24 and 25 will be shut off by the freezing of the cakes but the circulation will be continued across the tops of the cakes from the mouth of pipe 26 to the mouth of the overflow pipe 27, flushing off the impurities and causing all of the residual impurities to be discharged into the trap 34.

After the ice has been frozen firmly into cakes, thawing water is admitted from tank 31 through pipe 32 to the space 33 which, prior to this time, was an air space, which in addition to maintaining the proper insulation of the main freezing can with respect to the outside air also retained much of the cold created by the ammonia pipes and conducted chilled air to parts of the freezing cans not directly reached by the ammonia pipes. The passage of the thawing water through this space serves two important purposes. First it sufficiently loosens the cakes of ice in the several compartments to permit of their ready withdrawal by means of the stirrups 17, but in addition to that it causes a very considerable chilling of the thawing water and this thawing water is immediately thereafter utilized as the water to be frozen, it being noted that this thawing water is returned by the pump to the supply tank 19. Thus the same action that is loosening the cakes of ice to permit of their ready withdrawal is chilling the water which will thereafter be frozen. Consequently a very high degree of efficiency may be attained by the apparatus and method described.

It is distinctly to be understood that I do not limit myself to any particular volatile medium nor to the particular means of circulating the water as mentioned herein. While the particular arrangement shown wherein the water is circulated from the bottom to the top of the can is a convenient one the invention includes within its purview the circulation of the water in any direction whatever through the cans. It does not make a great deal of difference which direction the water circulates in through the freezing cans. The principle upon which emphasis is placed is that of circulation of the water through the cans rather than a mere agitation of the water in the cans. Furthermore, any suitable means may be effected for securing the circulation of the water. While, in the present embodiment, gravity is relied upon to conduct the water from tank 19 to the freezing cans or compartments it is manifest that gravity need not be relied upon in this respect but that pump 29 may be utilized to keep up the necessary circulation through pipes 30 and 20, irrespective of whether an open gravity tank is interposed between them or not.

Furthermore the trap for catching the impurities need not be in the particular location indicated but may be placed at any suitable point. A further important feature of the construction shown and described resides in the fact that the freezing cans and freezing compartments are not removable but constitute a rigid structure which remains in place with the circulating ammonia pipes. This is a marked improvement over the present can method in that the cans are not broken and there is much less handling to be done than under the present system. It will be understood that prior to the introduction of the thawing water into the space about the ammonia pipes and the inner wall of the main freezing can, the circulation of the ammonia is stopped and all of the freezing water left in the circulating line from tank 19 as well as the water in tanks 19 and 28 is flushed into the sewer. This flushes out trap 34 and carries off into the sewer all of the impurities collected in the process of freezing.

In explaining why it is that practically a pure cake of ice is secured, these facts should be reiterated and kept in mind, that in nature wherever it is possible in the process of freezing the pure water is first frozen and the water containing the impurities is continuously cast off from the cake of pure ice until it reaches a point where the impurities are concentrated into one solution which when frozen becomes visible to the naked eye and is called the white core, and this process by slowly circulating the water through cans, keeps up just enough movement in the water in the cans to permit this natural action to take place, that is, of freezing pure water first and concentrating the impurities in a comparatively compact solution. Thus in streams of water nature makes pure ice even out of muddy water where the streams have the right conditions and these right conditions include some movement of the water. All manufacturers of ice have discovered, and it is known in the art of manufacturing ice, that if the water in the cans is permitted to stand idle it will freeze white and not be pure and clear ice. It is further found that with a slight agitation of the water that the air bubbles will be driven from the body of the water and the ice formed will be pure ice.

This apparatus and method will make pure ice with less expense than any other known method of making pure ice and make it much more rapidly and with a great deal less trouble.

Having described my invention, what I claim is:

1. A device of the character described comprising a main freezing can, ammonia circulating pipes permanently associated with the main freezing can and extending along the opposite sides thereof, a thawing water compartment in which the main freezing can is located and which extends along both sides and the bottom of said freezing can, a source of raw water supply, means dividing the main freezing can into a plurality of compartments, means for conducting raw water from the raw water supply to the several compartments of the freezing can, an overflow pipe leading from the freezing can, a tank into which said overflow pipe discharges, means for returning water from said tank to the source of raw water supply to thereby maintain a circulation from the source of raw water supply through said compartment and back to said tank, a source of thawing water supply and means for conducting the thawing water from the thawing water compartment to said tank.

2. A device of the character described comprising a main freezing can, a plurality of partitions dividing the main freezing can into a plurality of compartments, a raw water supply pipe, connections between said raw water supply pipe and the lower portion of each of the compartments, a raw water supply pipe leading into the main freezing can above the level of the tops of the partitions, and an overflow pipe leading from the main freezing can above the level of the tops of the partitions, a thawing water supply tank, a sealed compartment within which the main freezing can is located, means for conducting water to said compartment from the thawing water tank and means for conducting the said thawing water to the interior of said freezing can.

3. Ice making apparatus comprising in combination an elongated main freezing can divided by a plurality of partitions into a series of compartments which taper from top to bottom, means for lifting cakes of ice from said compartments, a raw water tank, means for supplying water from the raw water tank to the main freezing can at the lower portions of the individual compartments and above the level of the partitions in said main freezing can, a sealed chamber in which the main freezing can is located and which extends along both sides and beneath the main freezing can, a source of thawing water leading to the space between the wall constituting said chamber and the main freezing can, ammonia circulating pipes permanently associated with the main freezing can and extending along the opposite sides thereof, a tank below the level of the main freezing can, a circulating pump taking its supply from said tank and discharging it into the raw water tank, an overflow pipe leading from the main freezing can above the level of the partitions therein and discharging into said tank below the level of the main freezing can so that a continuous circulation of water may be kept up through the main freezing can during the freezing operation, means for collecting the impurities from the water during the circulation thereof and for discharging said impurities and a pipe leading from the sealed chamber about the main ice can to the last named tank, by which the thawing water is delivered into the raw water supply after it has served its purpose of thawing a charge of ice.

In testimony whereof I hereunto affix my signature.

ROSCOE GREEN WILLARD.